March 13, 1956  J. H. KIRK  2,738,032
LUBRICATOR SIGHT GLASS
Filed July 8, 1952
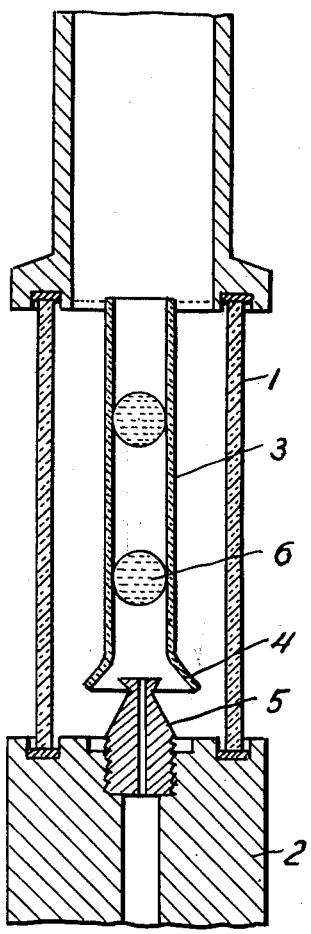
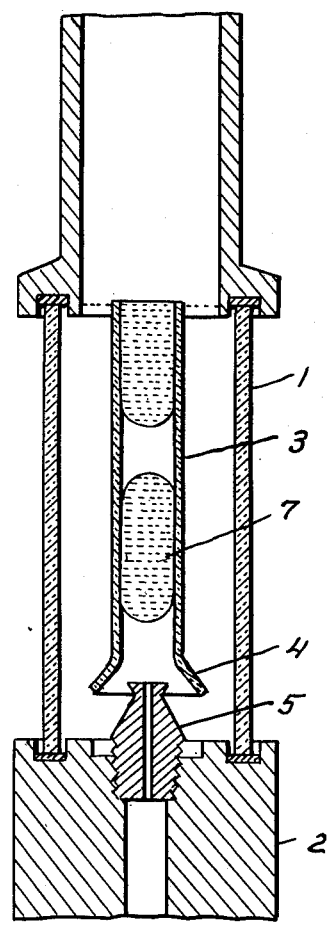
INVENTOR
JAMES H. KIRK
BY
Adams, Forward and McLean
ATTORNEYS

United States Patent Office 2,738,032
Patented Mar. 13, 1956

2,738,032

LUBRICATOR SIGHT GLASS

James H. Kirk, Dyer, Ind., assignor to Sinclair Refining Company, New York, N. Y., a corporation of Maine Application July 8, 1952, Serial No. 297,740

1 Claim. (Cl. 184—96)

My invention relates to mechanical force feed lubricators. In particular my invention relates to an improved apparatus for mechanical force feed lubricators operating on detergent oils by means of which the rate of oil delivery can be accurately and easily determined.

In conventional mechanical force feed lubricators the means of determining the rate of oil delivery is a sight glass comprising a hollow transparent cylinder situated in a line attached to the oil delivery line. The cylinder is filled with a suitable fluid, for example water or glycol and water. At the oil introductory end a nozzle is provided in the sight glass line for oil emergence. A guide wire is fixed above the center of the nozzle and extends through the sight glass to the oil delivery end. As the oil is pumped a quantity of oil from the oil delivery line is forced through the nozzle and a drop is formed which travels up the guide wire through the sight glass fluid. The rate of oil delivery is determined by counting the oil drops as they travel up the wire.

Difficulties arise, however, when conventional lubricators are operated on detergent oils. By detergent oils, I mean lubricating oils containing an additive which has detergent characteristics, for example, certain petroleum sulfonates. Because of their desirable characteristics, the use of detergent oils is rapidly increasing. Conventional sight glass fluids, for example, water or glycol and water, are undesirable for use with many detergent oils as it appears that sight glass fluids containing water react with the additive in the detergent oil resulting in a precipitate which causes the fluid and oil to emulsify and obscure the oil drops. Moreover, even when chemically inert sight glass fluids, for example, Dow-Corning 200/200, a colorless inert liquid silicone, are used in these conventional sight feed lubricators the drop formation is poor and heavy streaming of the oil through the fluid occurs so that it is impossible to determine accurately the rate of oil delivery. I have found that even when the guide wire in the sight glass is removed these conditions still persist and moreover, excessive carry-over of the sight glass fluid occurs. I have also found that coating the guide wire or nozzle to change the wettability of the parts by either the fluid or the oil does not improve the streaming or poor drop formation.

With the apparatus of my invention, however, the rate of detergent oil delivery from mechanical force feed lubricators can be accurately and easily determined while chemically inert sight glass fluids can be utilized. In general, the apparatus of my invention comprises a hollow transparent external cylinder, a hollow transparent internal cylinder flared at the oil introductory end and located concentric to and of a diameter substantially less than the external cylinder and oil introductory means adapted to direct small amounts of oil into the internal cylinder. The apparatus is situated in the oil delivery line of a mechanical force feed lubricator with suitable means for supporting the parts of the apparatus.

In operation the apparatus is first filled with a suitable transparent fluid. As the oil is pumped and with each stroke of the pump a quantity of oil from the oil delivery line is forced out of the oil introductory means into the small tube. The oil slowly moved up through the tube and between pump strokes some of the sight glass fluid flows from the bottom of the tube in behind the oil. Thus, a distinct oil drop is produced by each stroke of the pump which is separated in the tube from the other oil drops by some of the sight glass fluid. The rate of oil delivery can be easily and accurately estimated by the length of the drop in the tube. A small round drop indicates a low rate of oil delivery while a long drop or slug indicates a rapid rate.

Thus the apparatus of my invention provides means for accurately and easily determining the rate of oil delivery from mechanical force feed lubricators operating on detergent oils. Moreover, advantageous chemically inert sight glass fluids can be utilized. Oil drop formation is good and streaming of oil through the fluid is eliminated.

The apparatus of my invention will be further illustrated by reference to Figs. 1 and 1–a which are simplified diagrammatic illustrations of a sight glass especially adapted for service with mechanical force feed lubricators operating on detergent oils.

In Fig. 1, a hollow transparent cylinder 1 is inserted in line 2 which is attached to the oil delivery line of a mechanical force feed lubricator. A smaller hollow transparent cylinder 3 is located internally and concentric to the external cylinder 1. The small cylinder 3 is flared at the oil introductory end 4 to receive more easily the oil emerging from nozzle or jet 5. The flare is located so that the sight glass fluid flows freely between the flare and the nozzle 5.

In operation the sight glass is filled with a suitable transparent fluid. As the oil is pumped and with each stroke of the pump a quantity of oil is forced out of the nozzle 5 into the small cylinder 3. The oil moves slowly up the tube and the sight glass fluid flows from the bottom in behind the oil. Thus, a distinct oil drop 6 is produced by each stroke of the pump which is separated by some of the sight glass fluid. The rate of oil delivery is easily and accurately determined by the length of the oil drop in the tube. Thus in Fig. 1, a small round drop 6 is formed at a low rate of delivery while at a high rate a long drop or slug 7 is formed as in Fig. 1–a. The oil is returned to the oil delivery line.

The sight glass fluids that are advantageously useful in the apparatus of my invention are preferably chemically inert and water free so as to avoid any reaction with the additive in the detergent oil. I have found that colorless inert liquid silicones, for example, the products known as Dow-Corning fluids and particularly Dow-Corning 200/200, are especially useful as they give good spacing between the oil drops and are chemically inert. Other fluids such as a 30 per cent barium acetate solution and saturated barium chloride solution, however, are useful with some detergent oils.

The usefulness of the apparatus of my invention will be further illustrated by the following example.

*Example*

A mechanical force feed lubricator (McCord type) was equipped with the sight glass of my invention. The internal tube was a 6 mm. Pyrex glass tube about the length of the external cylinder. An oil containing a detergent additive was tested. The sight glass fluid was Dow-Corning 200/200. A 30-day test was run using the lubricator. The pumps were operated at approximately 3 strokes per minute. The rate of oil delivery was varied from 3.3 to 29.7 ml. per hour. The oil drops ranged from a small round drop for the low rate to a long drop or slug of about 1¼ inches in length for the high rate. The oil drop formation was good and no streaming occurred. After the 30-day test the sight glass fluid appeared to be about the same as at the start. There was no evidence of development of an emulsion or of carry-over of the fluid.

I claim:

A sight glass containing a chemically inert sight glass fluid suitable for location in an oil delivery line of a mechanical force lubricator operating on detergent oils, which comprises a vertical, hollow, transparent external cylinder having its upper and lower edges in communication with an oil delivery line, a nozzle located within the lower portion of the cylinder adapted to direct small amounts of oil from the delivery line into a vertical, hollow, transparent internal cylinder, flared at its lower edge, having a diameter substantially less than the diameter of the external cylinder, and located within and concentric to the external cylinder and in space relation to the delivery line and nozzle to permit free flow of sight glass fluid within the sight glass and prevent carry-over of sight glass fluid with detergent oil.

References Cited in the file of this patent
UNITED STATES PATENTS

| | | |
|---|---|---|
| 832,265 | Manzel | Oct. 2, 1906 |
| 922,113 | Edwards | May 18, 1909 |
| 951,234 | Cannon | Mar. 8, 1910 |
| 2,304,644 | Heftler | Dec. 8, 1942 |
| 2,483,363 | Villiers | Sept. 27, 1949 |